United States Patent
Pellerin et al.

(10) Patent No.: US 8,546,731 B2
(45) Date of Patent: Oct. 1, 2013

(54) ELECTRICAL APPLIANCE FOR COOKING FOOD

(75) Inventors: Olivier Pellerin, Caluire et Cuire (FR);
Florent Pontabry, Dijon (FR); Frederic Seurat, Bretigny (FR)

(73) Assignee: SEB S.A., Ecully (FR)

( * ) Notice: Subject to any disclaimer, the term of this patent is extended or adjusted under 35 U.S.C. 154(b) by 92 days.

(21) Appl. No.: 12/975,401

(22) Filed: Dec. 22, 2010

(65) Prior Publication Data

US 2011/0147365 A1    Jun. 23, 2011

(30) Foreign Application Priority Data

Dec. 23, 2009  (FR) ..................... 09 06318

(51) Int. Cl.
*F27D 11/00*    (2006.01)
*A47J 27/00*    (2006.01)

(52) U.S. Cl.
USPC ........... 219/440; 219/401; 219/389; 219/428; 219/429; 219/431; 99/330; 99/342; 99/337; 99/338; 99/340; 126/369; 126/373.1; 126/384.1

(58) Field of Classification Search
USPC ................... 99/330, 342, 337–340; 219/440, 219/401, 389.1, 389, 428–9, 431; 126/369, 126/373.1, 384.1
See application file for complete search history.

(56) References Cited

U.S. PATENT DOCUMENTS

| 3,940,589 A | 2/1976 | Tupper |
| 7,373,874 B2 * | 5/2008 | Seurat Guiochet et al. .... 99/337 |
| 2005/0132894 A1 | 6/2005 | Seurat Guiochet et al. |
| 2005/0223906 A1 | 10/2005 | Xu et al. |
| 2007/0221651 A1 * | 9/2007 | Kristina et al. ............... 219/432 |
| 2010/0028514 A1 | 2/2010 | Goderiaux et al. |

FOREIGN PATENT DOCUMENTS

| CN | 1522636 A | 8/2004 |
| EP | 1535553 A1 | 6/2005 |
| FR | 2896677 A1 | 8/2007 |
| JP | 2006325843 A | 12/2006 |

* cited by examiner

*Primary Examiner* — Shawntina Fuqua
(74) *Attorney, Agent, or Firm* — The Webb Law Firm

(57) ABSTRACT

An electric appliance for pressure cooking food includes a casing (1) and a lid (4) forming the outer jacket of the appliance, an outer vessel (2) forming the inner chamber of the appliance, a heating element (25) placed in the bottom of the outer vessel (2), a removable inner vessel (3) forming the container (30) for cooking food, wherein the inner vessel (3) includes at least one handhold (31) extending past the periphery of the casing (1).

20 Claims, 3 Drawing Sheets

ELECTRICAL APPLIANCE FOR COOKING FOOD

BACKGROUND OF THE INVENTION

1. Field of the Invention

The present invention relates to an electrical appliance for cooking food and more particularly to an appliance for pressure cooking.

2. Description of the Prior Art

Cookers used for cooking food under pressure exist in the public domain. These cookers require an outside source of heat (provided, for example, by an electric range). The cooker comprises a valve that is pressure calibrated in such a way as to regulate the pressure prevailing inside the cooking chamber.

Electric pressure cookers are also disclosed in Chinese patent # 1522636 and Japanese patent # 2006325843. These appliances essentially comprise a casing in which are housed an inner vessel and an outer vessel. The inner vessel is for cooking food. The outer vessel constitutes the heating chamber for the inner vessel. Electric pressure cookers usually comprise a lid hinge-mounted on the casing. The lid is locked onto the inner vessel in such a way as to ensure an increase in pressure for cooking the food.

After cooking the food, the inner vessel is very hot. In order to recover the cooked food, it is necessary to use either a detachable hook or handhold to remove the inner vessel from the appliance, or to remove the food from the inner vessel with a utensil (spoon, fork, etc.).

It is also preferable to put food in the appliance with the inner vessel already placed in the casing. Once the inner vessel is filled with food, it becomes difficult to manipulate because it possesses only a simple rim as a result of the design.

SUMMARY OF THE INVENTION

The present invention aims to propose an electric appliance for cooking food in which the inner vessel is easy to manipulate.

This object is achieved by an electric appliance for cooking food comprising a casing and a lid forming the outer jacket of the appliance, an outer vessel forming the inner chamber of the appliance, a heating element disposed in the bottom of the outer vessel, a removable inner vessel forming the container for cooking food, characterized in that the inner vessel comprises at least one handhold extending past the periphery of the casing.

The design of the appliance was thus modified in order to equip the inner vessel with a handhold for easier and safer manipulation thereof. Furthermore, as the handholds are positioned outside the appliance, the temperature thereof remains within a range of values sufficiently low to prevent burns.

According to other additional characteristics:
- the lid comprises means for locking onto the outer vessel.
- the locking means comprise at least two jaws that are radially movable relative to the lid.
- each jaw is integrally formed with a rod, one end of which is engaged in a control device mounted in rotation on the lid.
- the control device is integrally formed with a handhold of the lid.
- the locking means comprise a blocking device in the locked position.
- the lid is removable.
- the lid comprises a gasket that presses closely against the top edge of the inner vessel when the lid is closed.
- the appliance comprises a removable tub for recovering condensates, which is mounted in a recess of the side wall of the casing.

BRIEF DESCRIPTION OF THE DRAWINGS

Other unique aspects and advantages of the present invention will emerge more clearly from the description of an embodiment given as a non-limiting example and illustrated in the appended drawings, in which.

DETAILED DESCRIPTION OF THE INVENTION

The electric appliance for cooking food according to the invention is also known as an electric pressure cooker.

Figure 1:
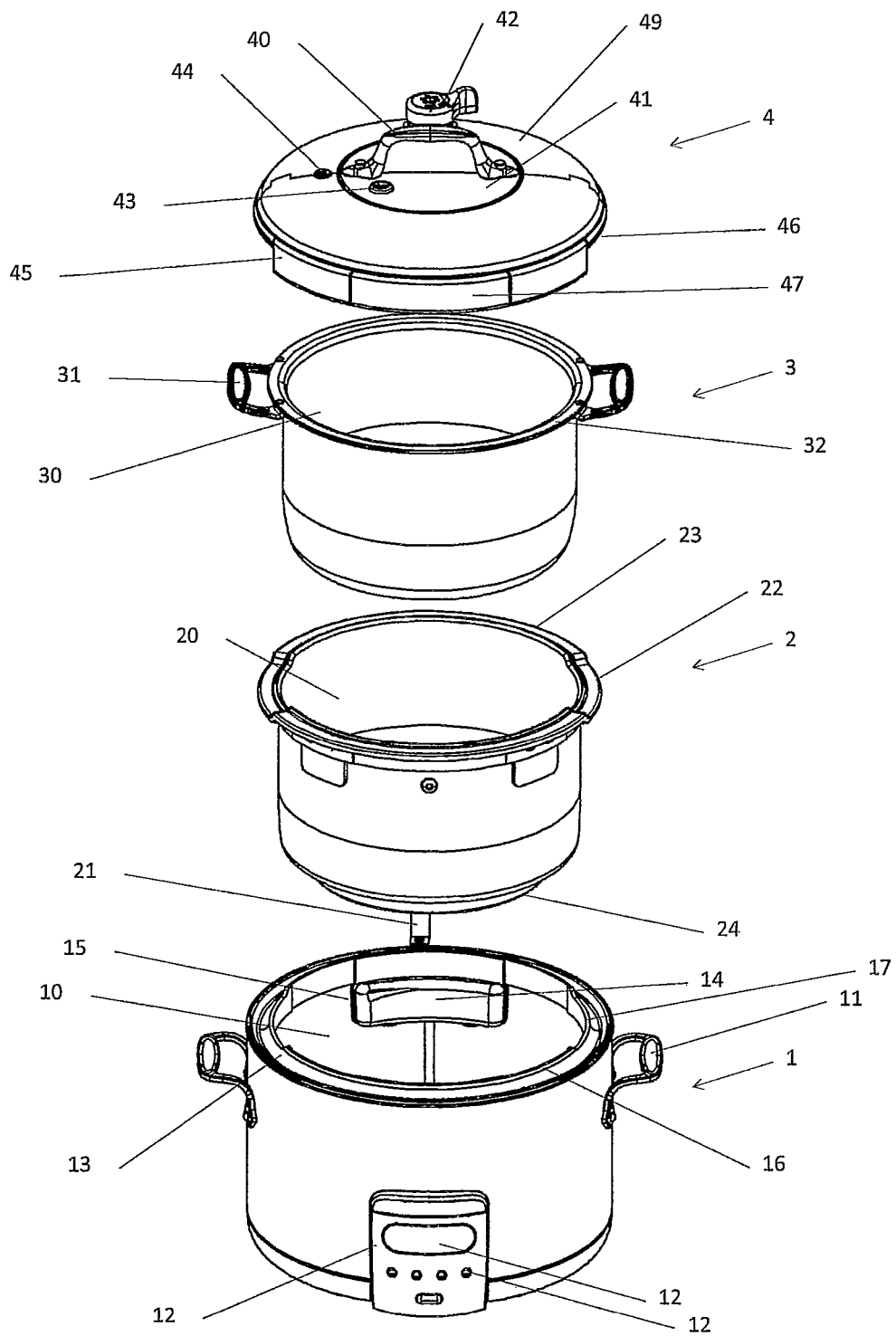
FIG. 1 is an exploded perspective view of an electric appliance for cooking food according to the invention.
Figure 2:
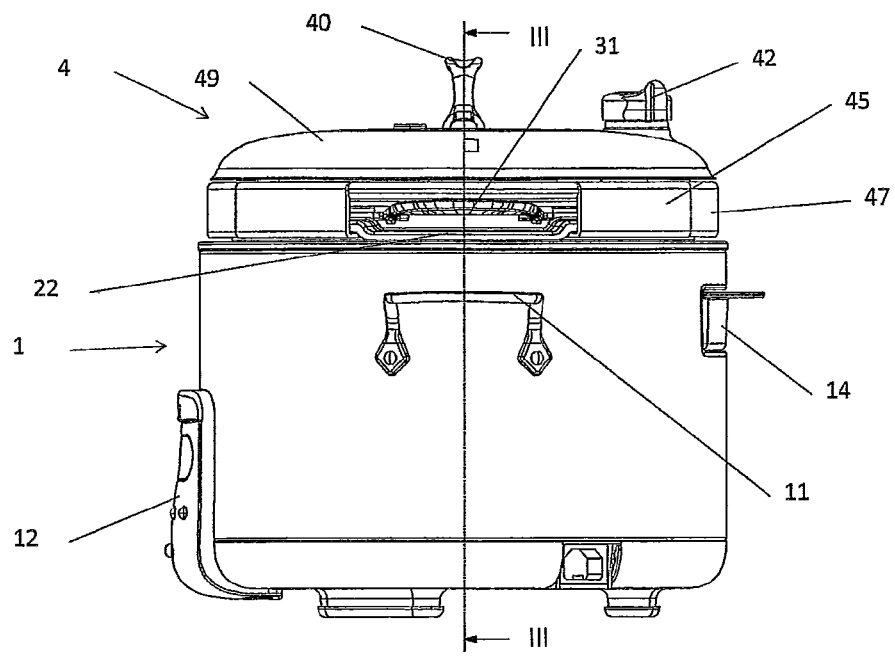
FIG. 2 is a side view of an electric appliance for cooking food according to the invention.

According to FIGS. 1 and 2, the appliance essentially comprises a casing 1 closed by a lid 4. The inside 10 of the casing 1 is designed to receive an outer vessel 2. The outer vessel 2 corresponds to the heating chamber of the appliance. To this end, the bottom of the outer vessel 2 comprises at least one heating element, which shall be described later. The cooking of the food takes place in an inner vessel 3 placed in the outer vessel 2, on the heating element(s).

The casing 1 and the lid 4 form the outer jacket of the appliance. The casing 1 is essentially cylindrical and comprises handholds 11 diametrically positioned on the outer wall of the casing 1. The handholds 11 are placed in the top half of the casing 1. The outer wall of the casing 1 can be made of metal or plastic.

The casing 1 also comprises a control panel 12 for the appliance for controlling the heating elements of said appliance. The control panel 12 is placed, for example, in the bottom half of the casing 1 and appreciably between the two handholds 11. The control panel 12 comprises several switches enabling the user to select the method and time for cooking the food.

The top edge 13 of the casing 1 comprises a rim forming a chute or a channel. This channel is designed to collect condensates that may form from the cooking of the food. The casing 1 also comprises a condensate recovery tub 14 mounted in a recess 15 of the side wall of the casing 1. The tub 14 is placed under the channel, which comprises a hole perpendicular to the tub in order to allow the condensates to drain. According to the variant of embodiment, the condensate recovery tub 14 is removable from the outside of the casing 1.

The wall of the casing 1 can comprise openings (not shown) in, for example, the top half of the casing 1. These openings make it possible to restrict the rising of the temperature inside the casing 1 during cooking phases.

The outer vessel 2 is appreciably cylinder-shaped and its dimensions are smaller than the inner dimensions of the casing 1. Hence a clearance is formed between the outer vessel 2 and the inner wall of the casing 1. Likewise, the bottom 24 of the outer vessel 2 comprises feet 21 that come to rest on the bottom of the casing 1. These feet 21 also make it possible to fasten the outer vessel 2 on the bottom of the casing 1. The outer vessel 2 also defines the heating chamber 20 of the inner vessel 3. The bottom of this heating chamber 20 comprises the heating elements (not shown). The top edge of the outer vessel 2 comprises a shoulder 23 that presses closely against the top edge 13 of the casing 1 when the outer vessel 2 is in position. The shoulder 23 comprises at least two flat areas or depressions 22 for receiving the handholds 31 of the inner vessel 3. Likewise, the top edge 13 of the casing 1 comprises at least two notches 17 corresponding to the flat areas 22 for the positioning of the outer vessel 2 in the casing 1.

The inner vessel 3 constitutes the container or the chamber 30 for cooking food of the electric appliance according to the invention. According to the invention, the inner vessel 3 is removable and comprises at least one handhold 31.

According to the variant shown in the figures, the inner vessel 3 comprises two handholds 31 positioned diametrically opposed on the edge 32 of the inner vessel 3. The edge 32 can form a shoulder in relation to the wall of the outer vessel 2. The handholds 31 can then be fastened onto this shoulder. According to another variant, the handholds 31 can be fastened on the side of the inner vessel 3. The handholds 31 can be handles such as the ones illustrated. However, other kinds of handholds (knobs, sleeves, etc.) are also possible. The inside surface of the inner vessel 3 can be covered with a PTFE anti-stick coating. The bottom of the inner vessel 3 can also be curved.

The lid 4 mainly comprises means 41, 43, 45 for locking onto the casing 1, a valve 42 for depressurizing the cooking chamber 30, a safety valve 44, a handhold 40 for maneuvering the lid, and a cap 49 for hiding the locking means 41, 43, 45. According to the variant illustrated, the lid 4 is removable, i.e., it can be completely detached from the casing 1. However, provision of a lid 4 hinge-mounted on the casing 1 is likewise conceivable.

The configuration and construction of the depressurization valve 42 are known per se. The valve 42 can be manipulated by the user in such a way that the latter can select either cooking without pressure by moving the valve 42 to the open position or cooking under pressure by moving the valve 42 to the closed position. The user can also move the valve 42 to the open position at the end of a pressure cooking process in order to depressurize the cooking chamber 30.

The depressurization valve 42 is also designed to ensure an automatic decompression of the cooking chamber 30 in the event that the pressure exceeds a specified threshold. The safety valve, for example, is calibrated to 100 kPa.

The valve 44 makes it possible to prevent the opening of the lid if the pressure inside the inner vessel is greater than a predetermined threshold of, for example, 4 kPa.

The means for locking the lid according to the invention comprise a plurality of jaws 45. According to the variant of embodiment, the lid comprises 4 locking jaws. The jaws 45 are locked onto the shoulder 23 of the outer vessel 2 by moving said jaws 45 in radial translation. The details of the interaction between the jaws 45 and the outer vessel 2 will be described later on, with reference to FIGS. 3 and 4. The actuation of the jaws is triggered by the rotation of a lock plate 41 mounted on the lid 4. The handhold 40 can be fastened to the lock plate 41. Hence the rotation of the handhold 40 brings about the locking or unlocking of the jaws 45 on the outer vessel of the appliance. To prevent the accidental opening of the lid after the jaws 45 are locked onto the outer vessel, provision is made of a blocking device 43 on the top of the lid. The blocking device 43 prevents the rotation of the lock plate and consequently the movement of the jaws 45. To open the lid 4, the blocking device 43 must be actuated in order to release the lock plate 41, which can then be maneuvered in rotation by means of the handhold 40 of the lid.

Decorative elements 47 can be attached on the circumference of the lid 4, between the locking jaws 45. However, the areas 46 situated in line with the handholds 31 of the vessel do not comprise decorative elements, in order to leave space for the handholds 31 of the outer vessel 3.

The decorative elements 47 and the areas 46 can also be used to provide a guide for easing the positioning of the lid 4, as well as for the indexation and securing of the lid 4.

In order to ensure the correct positioning of the inner vessel 3 on the outer vessel 2, means (not shown) for indexing the position of the lid 4 can be added. The outer vessel 2 can thus comprise a pin in each flat area 22. This pin is dimensioned so that it positions itself in the handle of the handholds 31 of the inner vessel 3. In this manner it is not possible to position the lid 4 and lock the jaws 45 onto the outer vessel 2 unless the inner vessel 3 is correctly positioned. Furthermore, the decorative elements 47 and the areas 46 enable the indexation of the lid 4 on the inner vessel 3, which thanks to the pins is itself correctly positioned in the outer vessel 2. This makes it possible to block the lid 4 in rotation, which facilitates the locking of the lid 4 onto the outer vessel 2.

An alternative means for indexing the position of the lid 4 on the casing 1 consists of forming a notch in one or several decorative elements 47 and a corresponding pin or post on the top edge 13 of the casing 1. The engagement of the post in the notch ensures the correct positioning of the lid 4 on the casing 1 and keeps the lid from turning during the locking operation.

The lid 4 further comprises a gasket 48 (FIGS. 3 and 4) on its inner surface. This gasket ensures a pressure-resistant sealing of the cooking chamber 30 when the lid 4 is locked onto the outer vessel 2.

Figure 3:
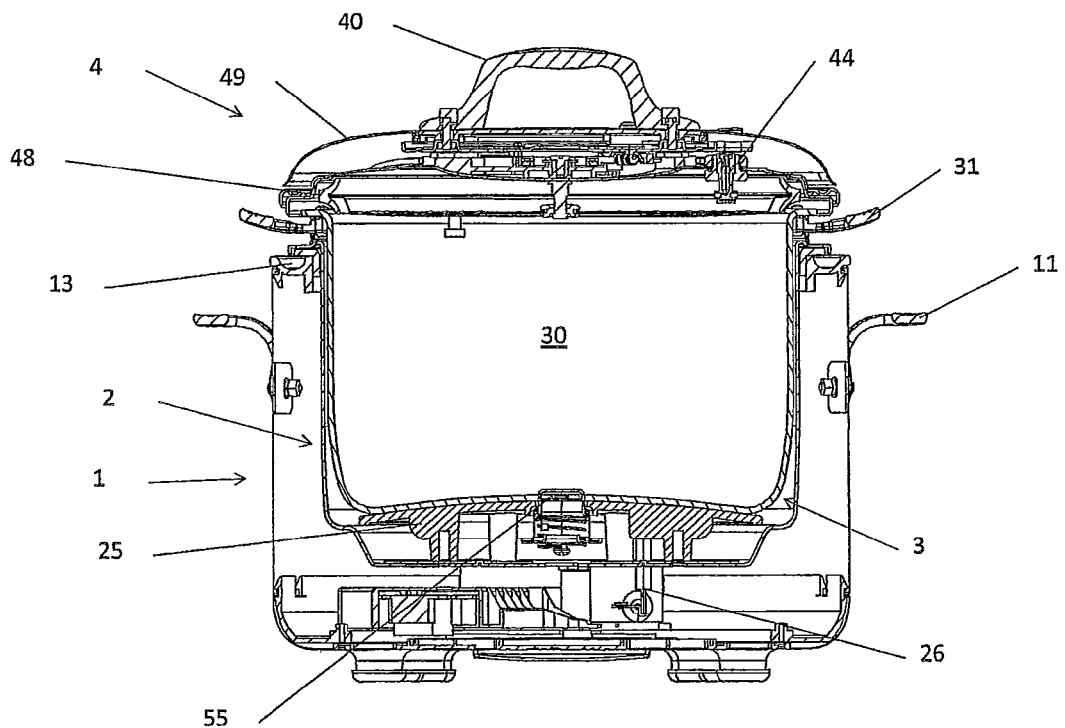
FIG. 3 is a cutaway view along the intersection line of FIG. 2.
Figure 4:
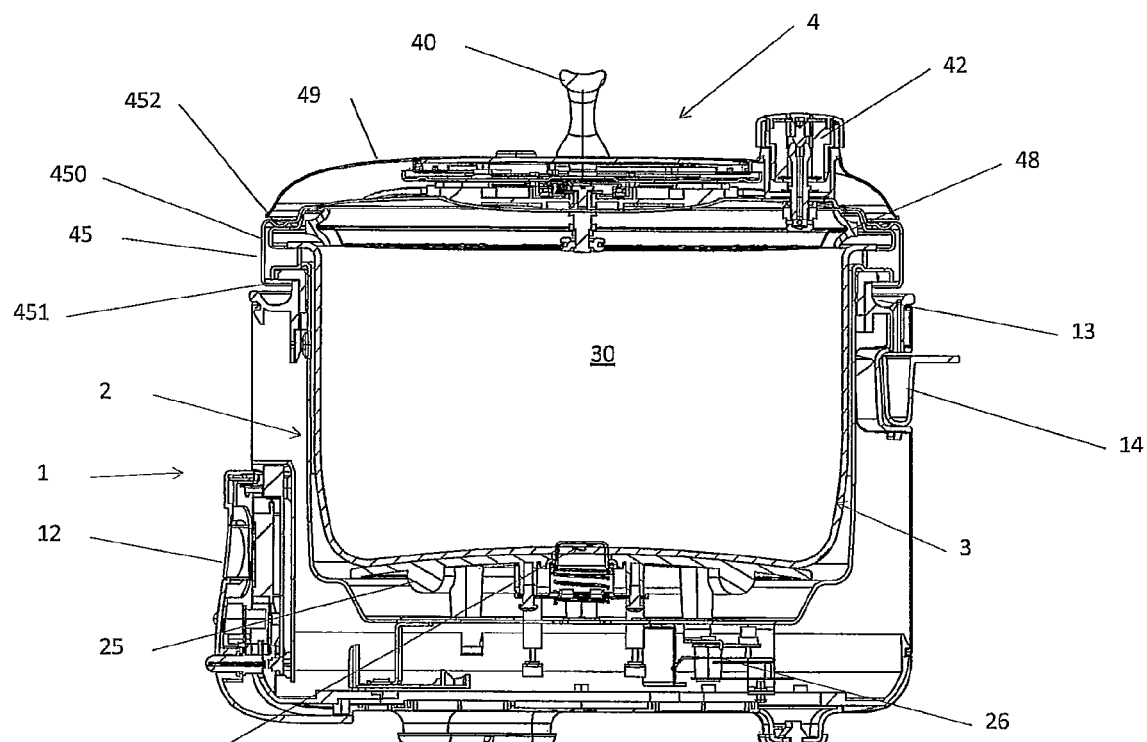
FIG. 4 is a cutaway view along a longitudinal plane perpendicular to the intersection line III-III of FIG. 2.

According to another characteristic that is more visible in FIGS. 3 and 4, the dimensions of the handholds 31 of the vessel 3 are selected so that said handholds extend past the casing 1 of the appliance. In other words, the ends of the handholds 31 of the vessel are further away from the axis of the appliance than the top edge 13 of the casing 1. Because the handholds 31 extend past the casing 1, the user can easily grasp the handles of the handholds 31 of the inner vessel 3 when the latter is placed in the outer vessel 2.

FIGS. 3 and 4 also show the position of the gasket 48 on the inner surface of the lid 4. The gasket 48 is circular, and the cross-section of the gasket 48 is V-shaped. The gasket 48 is positioned on the lid 4 so that it comes into contact with the top edge of the inner vessel 3 when the lid 4 is closed. The point of the "V" of the cross-section of the gasket 48 is oriented towards the outside.

FIG. 4 shows the mechanical interaction between the locking jaws 45 and the outer vessel 2 in more detail. According to the proposed variant of embodiment, the cross-section of the jaws 45 is appreciably U-shaped. The two branches of the "U" are oriented towards the axis of the appliance and constitute the top and bottom sides 452 and 451, respectively, of the jaw 45. The bottom 450 of the "U" is parallel to the axis of the appliance and corresponds to the visible side of the jaw 45. In the locking position, the bottom side 451 of the jaw 45 is placed under the shoulder 23 of the outer vessel 2 in such a way that it is no longer possible to raise the lid 4. The rise in pressure inside the cooking chamber 30 tends to raise the lid 4. This movement is blocked by the position of the jaw 45. As explained previously, the gasket 48 of the lid 4 ensures that the cooking chamber 30 is sealed.

As indicated previously, the rise in temperature of the cooking chamber is ensured by a heating element 25. The heating element 25 is of a type known per se. For example, the heating element 25 consists of an aluminum block with an internal electric heating resistor.

However, use can also be made of an induction-type heating element. To regulate the temperature of the cooking chamber 30, a temperature sensor 55 is placed on the heating element at the bottom and in the middle of the inner vessel 3.

The heating element 25 is also controlled in order to regulate the pressure inside the cooking chamber 30. The pressure in the cooking chamber 30 is measured by measuring the deformation of the bottom of the inner vessel 3. The increasing pressure inside the cooking chamber 30 generates mechanical stresses that tend to deform the bottom of the inner vessel 3. These mechanical stresses are then transmitted to the bottom of the outer vessel 2 via the heating element 25. The deformation of the outer vessel 2 is then detected, for example, by a displacement sensor 26. The measured displacement value is then extrapolated to a pressure value.

Figure 5:
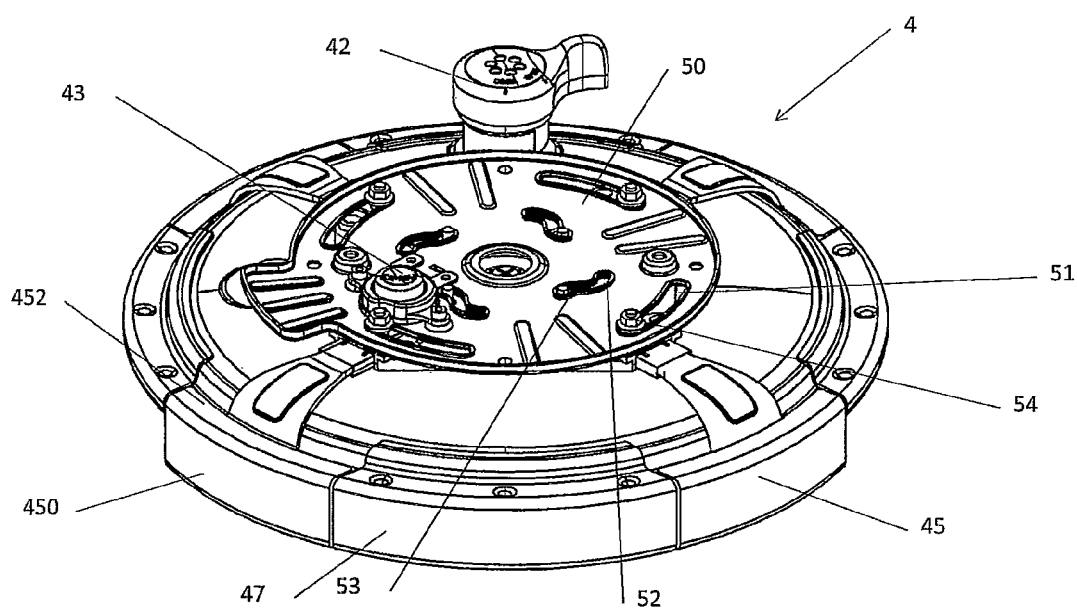
FIG. 5 is a partial perspective view of the lid of an electric appliance for cooking food according to the invention.

The locking means will now be described with reference to FIG. 5. For a better understanding of the locking mechanism of the appliance, the protective cap 49 of the lid, the handhold 40, and the lock plate are not shown.

The locking means essentially comprise the jaws 45, guide rods 54, and a control device 50. Each top side 452 of a jaw 45 is displaceably mounted in translation on the lid 4 by means of, for example, a rod 54. One end of the rod 54 comprises a post 53 slidably mounted in a slot 52 of the control device 50. The control device 50 comprises a circular plate 50 mounted on the lid 4 in rotation relative to the axis of the appliance. The guidance in rotation of the plate 50 is ensured by a circular arc-shaped rib 51, in which is engaged a post that is fixedly mounted in relation to the lid 4. It is also possible to ensure this guidance in rotation by other means such as, for example, a guidance on a central axis.

The slot 52 in which the post 53 of the rod 54 slides is appreciably S-shaped. As the plate 50 rotates, the post 50 follows the contour of the slot 52 and brings about the radial translation of the rod 54 and hence of the jaw 45. The length of the slot 52 and of the rib 51 restricts the amplitude of rotation of the plate 50. In the proposed illustrative embodiment, the amplitude of rotation is ca. 30° for a displacement in translation of the jaws 45 of around 1 cm. The plate 50 supports the lock plate 41 of FIG. 1, on which is fastened the handhold 40 of the lid.

The electric appliance for cooking food according to the invention is operated as follows. First of all the user puts the ingredients in the inner vessel 3. He or she can do this either with the inner vessel 3 already positioned in the casing 1 or with the inner vessel removed from the casing. In the latter case, the inner vessel 3 is placed in the outer vessel 2 using the handholds 31. Next the user closes the appliance by placing the lid 4 on the top edge 13 of the casing 1, and then locks the lid 4 onto the outer vessel 2 by turning the handhold 40 of the lid.

The user can then use the control panel 12 to select different methods of cooking. For example, the appliance can be used for 4 kinds of cooking: roasting, browning, low pressure cooking, high pressure cooking.

Roasting and browning take place at atmospheric pressure. For doing so, the depressurization valve 42 is in the open position or else the lid is open. The difference between these two kinds of cooking is the set temperature of the heating element 25.

Pressure cooking requires closing the depressurization valve 42. The heating element 25 is regulated as a function of the pressure level prevailing in the inner vessel 3.

When the cook time set by the user is up, the heating elements are turned off. The user can then unlock the lid 4 as described previously. Once the lid 4 has been removed, the user can take out the inner vessel 3 by grasping the handholds 31.

The handholds 31 on the inner vessel 3 have a dual purpose: making the inner vessel easier to manipulate on one hand and lowering the risk of burns during the manipulation thereof on the other hand.

The invention claimed is:

1. Electric appliance for pressure cooking foods comprising a casing and a lid forming an outer jacket of the appliance, an outer vessel forming an inner chamber of the appliance, a heating element placed in a bottom of the outer vessel, a removable inner vessel forming a container for cooking food, wherein the inner vessel comprises at least one handhold extending past a periphery of the casing, and a valve adapted to be manipulated between a closed position for maintaining pressure within the container for cooking food and an open position for depressurizing the container for cooking food.

2. Electric appliance for pressure cooking foods as in claim 1, wherein the lid comprises means for locking onto the outer vessel.

3. Electric appliance for pressure cooking foods as in claim 2, wherein the locking means comprises at least two jaws that are radially displaceable in relation to the lid.

4. Electric appliance for pressure cooking foods as in claim 3, wherein each jaw is integrally formed with a rod, one end of which is engaged in a control device rotatably mounted on the lid.

5. Electric appliance for pressure cooking foods as in claim 4, wherein the control device is integrally formed with a handhold of the lid.

6. Electric appliance for pressure cooking foods as in claim 2, wherein the locking means comprises a blocking device to prevent inadvertent opening of the locking means when said locking means is in a locked position.

7. Electric appliance for pressure cooking foods as in claim 1, wherein the lid is removable.

8. Electric appliance for pressure cooking foods as in claim 1, wherein the lid comprises a gasket pressing closely against a top edge of the inner vessel when the lid is closed.

9. Electric appliance for pressure cooking foods as in claim 1, wherein said appliance comprises a removable condensate recovery tub mounted in a recess of a side wall of the casing.

10. Electric appliance for pressure cooking foods as in claim 3, wherein the locking means comprises a blocking device to prevent inadvertent opening of the locking means when said locking means is in a locked position.

11. Electric appliance for pressure cooking foods as in claim 4, wherein the locking means comprises a blocking device to prevent inadvertent opening of the locking means when said locking means is in a locked position.

12. Electric appliance for pressure cooking foods as in claim 5, wherein the locking means comprises a blocking device to prevent inadvertent opening of the locking means when said locking means is in a locked position.

13. Electric appliance for pressure cooking foods as in claim 2, wherein the lid is removable.

14. Electric appliance for pressure cooking foods as in claim 3, wherein the lid is removable.

15. Electric appliance for pressure cooking foods as in claim 2, wherein the lid comprises a gasket pressing closely against a top edge of the inner vessel when the lid is closed.

16. Electric appliance for pressure cooking foods as in claim 3, wherein the lid comprises a gasket pressing closely against a top edge of the inner vessel when the lid is closed.

17. Electric appliance for pressure cooking foods as in claim 4, wherein the lid comprises a gasket pressing closely against a top edge of the inner vessel when the lid is closed.

18. Electric appliance for pressure cooking foods as in claim 2, wherein said appliance comprises a removable condensate recovery tub mounted in a recess of a side wall of the casing.

19. Electric appliance for pressure cooking foods as in claim 3, wherein said appliance comprises a removable condensate recovery tub mounted in a recess of a side wall of the casing.

20. Electric appliance for pressure cooking foods as in claim 4, wherein said appliance comprises a removable condensate recovery tub mounted in a recess of a side wall of the casing.

* * * * *